US007366236B1

(12) United States Patent
Winger (10) Patent No.: US 7,366,236 B1
(45) Date of Patent: Apr. 29, 2008

(54) SOURCE ADAPTIVE SYSTEM AND METHOD FOR 2D IDCT

(75) Inventor: Lowell Winger, Waterloo (CA)

(73) Assignee: Cisco Sytems Canada Co., Halifax, Nova Scotia (CA)

( * ) Notice: Subject to any disclaimer, the term of this patent is extended or adjusted under 35 U.S.C. 154(b) by 832 days.

(21) Appl. No.: 09/874,587

(22) Filed: Jun. 4, 2001

(51) Int. Cl.
*H04B 1/66* (2006.01)
(52) U.S. Cl. .................................. 375/240.02
(58) Field of Classification Search ........... 375/240.03, 375/240.12–240.16, 240.18, 240.2, 240.23, 375/240.24, 240.02; 382/232, 233, 248, 382/250, 170; *H04N 7/12, 7/30; H04B 1/66*
See application file for complete search history.

(56) References Cited

U.S. PATENT DOCUMENTS

| | | | |
|---|---|---|---|
| 5,493,456 | A | 2/1996 | Augenbraun et al. |
| 5,570,197 | A | 10/1996 | Boon |
| 5,689,346 | A * | 11/1997 | Noda et al. ............ 358/426.11 |
| 5,751,701 | A | 5/1998 | Langberg et al. |
| 5,754,235 | A | 5/1998 | Urano et al. |
| 5,768,536 | A * | 6/1998 | Strongin et al. ....... 375/240.23 |
| 5,812,786 | A | 9/1998 | Seazholtz et al. |
| 5,872,866 | A * | 2/1999 | Strongin et al. ......... 375/240.2 |
| 6,002,801 | A * | 12/1999 | Strongin et al. ....... 375/240.18 |
| 6,009,203 | A * | 12/1999 | Liu et al. ..................... 382/233 |
| 6,026,097 | A | 2/2000 | Voois et al. |
| 6,111,913 | A | 8/2000 | Murdock et al. |
| 6,304,604 | B1 | 10/2001 | Adiletta et al. |
| 6,377,627 | B1 | 4/2002 | Shen et al. |
| 6,650,707 | B2 * | 11/2003 | Youn et al. ............ 375/240.12 |
| 6,701,016 | B1 | 3/2004 | Jojic et al. |
| 6,763,070 | B1 | 7/2004 | Lee |
| 2001/0021268 | A1 * | 9/2001 | Jun et al. ..................... 382/170 |
| 2002/0027954 | A1 * | 3/2002 | Singh et al. ........... 375/240.03 |

FOREIGN PATENT DOCUMENTS

| | | |
|---|---|---|
| EP | 0 103 438 A1 | 3/1984 |
| GB | 1 523 753 | 6/1978 |
| GB | 2 061 581 A | 5/1981 |
| GB | 2 118 750 A | 2/1983 |

(Continued)

OTHER PUBLICATIONS

Murata et al, "Fast 2D IDCT Implementation With Multimedia Instructions For A Software MPEG2 Decoder", Jun. 1998, IEEE International Conference on Image Processing, pp. 3105-3108.*

(Continued)

*Primary Examiner*—Tung Vo
(74) *Attorney, Agent, or Firm*—Beyer Weaver LLP (57) ABSTRACT

This invention discloses a fast two-dimensional inverse Discrete Cosine Transform (iDCT) that adapts to compressed video source statistics to reduce execution time. iDCT algorithms for sparse blocks eliminate calculations for some zero coefficients and are implemented with quad-word parallel single-instruction-multiple-data (SIMD) multimedia instructions. It is observed that end-of-block marker value histograms vary little within single shots. An adaptive control mechanism is proposed that selects the optimal set of iDCTs to prepare for an entire shot from its first frames (to reduce software overheads and penalties). This introduces no degradation of decoded video quality as compared with a conventional SIMD 8×8 iDCT implemented with Intel MMX instructions.

20 Claims, 7 Drawing Sheets

FOREIGN PATENT DOCUMENTS

| | | |
|---|---|---|
| GB | 2 288 044 A | 4/1995 |
| GB | 2 286 277 A | 9/1995 |
| WO | WO 87/06416 | 10/1987 |

OTHER PUBLICATIONS

Ji Zhang and Shan Zhu, "Methods And Apparatus For Performing Efficient Inverse Transform Operations", U.S. Appl. No. 09/894,113, filed Jun. 4, 2001, 28 pages.

ATM Forum Technical Committee UNI 3.1 Specification, "*The ATM Forum Technical Committee*", User-Network Interface (UNI) Specification Version 3.1, Sep. 1994, 396 pages.

Ansi, "*American National Standard for Telecommunications—Network and Customer Installation Interfaces—Asymmetric Digital Subscriber Line (ADSL) Metallic Interface*", American National Standards Institute, ANSI T1.413-1995, Aug. 18, 1995, 170 pages.

ISO/IEP "*Information Technology-Generic Coding Of Moving Pictures And Associated Audio: Systems*", ISO/IEC 13818-1, Nov. 13, 1994, 135 pages.

ISO/IEP "*Information Technology-Generic Coding Of Moving Pictures And Associated Audio Information: Video*", ISO/IEC 13818-2, 1995, 209 pages.

ISO/IEP "*Information Technology-Generic Coding Of Moving Pictures And Associated Audio: Audio*", ISO/IEP 13808-3, Nov. 11, 1994, 104 pages.

\* cited by examiner

SOURCE ADAPTIVE SYSTEM AND METHOD FOR 2D IDCT

FIELD OF THE INVENTION

The present invention relates generally to systems and methods for the compression of digital images. More specifically the present invention relates to the selection and utilization of an optimal set of two dimensional inverse Discrete Cosine Transform (iDCT) algorithms.

BACKGROUND OF THE INVENTION

Creating a high definition digital image requires a large amount of data. As stated by John Wiseman in *An Introduction to MPEG Video Compression;*

> One of the formats defined for HDTV broadcasting within the United States is 1920 pixels horizontally by 1080 lines vertically, at 30 frames per second. If these numbers are all multiplied together, along with 8 bits for each of the three primary colors, the total data rate required would be approximately 1.5 Gb/sec. Because of the 6 MHz channel bandwidth allocated, each channel will only support a data rate of 19.2 Mb/sec, which is further reduced to 18 Mb/sec by the fact that the channel must also support audio, transport, and ancillary data information. As can be seen, this restriction in data rate means that the original signal must be compressed by a figure of approximately 83:1.

Software video decoding is now a common function for multimedia computers, however, as it requires a lot of computational power, available resolutions and formats are currently limited. The MPEG video coding standards, the ITU-T Recommendations H.26x for low bitrate coding of motion video, and the JPEG still image coding all use the discrete cosine transform (DCT) and iDCT for energy compaction and decorrelation.

Thus, there is a need for a flexible and low cost solution to improve digital image compression through the use of an optimal iDCT.

SUMMARY OF THE INVENTION

The present invention relates to a system and method for the reduction of iDCT execution time.

One aspect of the present invention is a method for reducing iDCT execution time, the method having the steps of:

a) examining the coefficients of a DCT block to determine the position of the EOB coefficient;

b) selecting an iDCT algorithm from the set consisting of: iDCT Normal, iDCT_high, iDCT_low, iDCT_AC and iDCT_DC; said algorithm determined by said EOB coefficient; and c) executing the iDCT algorithm.

In another aspect of the present invention, there is provided a system for reducing iDCT execution time, the system having:

a) examination means to determine the position of an EOB coefficient in a DCT block;

b) selection means for selecting an iDCT algorithm based upon the position of said EOB; and c) execution means for executing said iDCT algorithm.

In another aspect of the present invention, there is provided a computer readable medium containing instructions for reducing iDCT execution time, said instructions performing the steps of:

a) examining the coefficients of a DCT block to determine the position of the EOB coefficient;

b) selecting an iDCT algorithm from the set consisting of: iDCT Normal, iDCT_high, iDCT_low, iDCT_AC and iDCT_DC; the selected algorithm determined by the EOB coefficient; and c) executing the iDCT algorithm.

In another aspect of the present invention there is provided a system for reducing iDCT execution time, the system including:

a) a set of iDCT algorithms;

b) a switch for selecting a selected algorithm from the set of algorithms; and c) a computer processor for executing the algorithm.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE PREFERRED EMBODIMENTS

The transmission and reception of digital video requires complex hardware and software components. It is not the intent of this disclosure to address all such components but rather to address the specific areas within a digital video system in which the present invention may be utilized.

Figure 1:
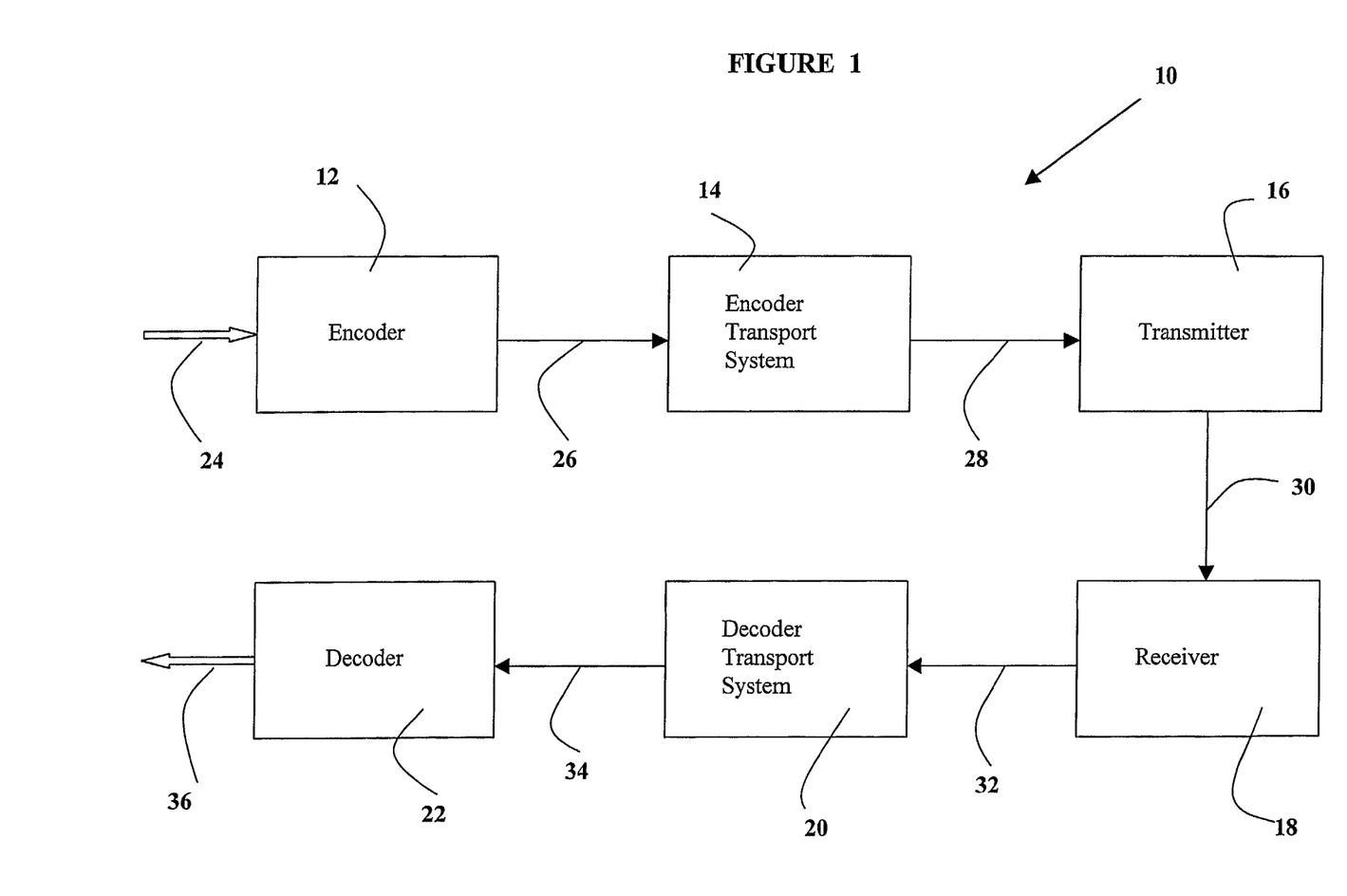
FIG. 1 is a block diagram of a system utilizing the present invention.

By way of introduction we refer first to FIG. 1, a generic digital video system, shown generally as 10. FIG. 1 is an overview of a generic system in which the present invention may be utilized. System 10 comprises encoder 12, encoder transport system 14, transmitter 16, receiver 18, decoder transport system 20 and decoder 22. Encoder 12 accepts as input source video 24. Source video 24 may come from a plurality of sources, but for the purpose of simplicity the reader may think of video source 24 as coming from analog sources such as a television transmission. Encoder 12 receives video source 24 and through the utilization of any number of compression algorithms translates video source 24 into an elementary video stream 26. The discussion of the structure of an elementary video stream and other details of MPEG-2 structure is beyond the scope of this disclosure. The structural details are defined in the following Motion Pictures Expert Group (MPEG) standards:

1) MPEG-2 Systems Group. Information Technology—Generic Coding of Moving Pictures and Associated Audio: Part 1—Systems, ISO/IEC 13180-1 International Standard 1995.

2) MPEG-2 Video Group. Information Technology—Generic Coding of Moving Pictures and Associated Audio: Part 2—Video ISO/IEC 13818-2 International Standard, 1995.

3) MPEG-2 Audio Group. Information Technology—Generic Coding of Moving Pictures and Associated Audio: Part 3—Audio, ISO/IEC 1318-3 International Standard, 1995.

Each of the above three references is incorporated herein by reference.

Encoder transport system 14 receives video stream 26 and further restructures video stream 26 into transport packet stream 28. The details of the structure of transport packets are provided in the MPEG-2 standard. Stream 28 is then passed to a transmitter 16, which in turn forwards stream 28 to receiver 18 via a communications channel 30. Communications channel 30 may take on a variety of forms such as, wireless or cable or any other form of transmitting data. Receiver 18 receives the data transmitted by communication channel 30 and in turn passes it in the form of a second transport packet stream 32. In a perfect world, stream 28 and stream 32 will be identical. Decoder transport system 20 receives stream 32 and produces a second elementary video stream 34. Once again, in a perfect world, stream 26 and stream 34 would be identical. Decoder 22 accepts stream 34 and outputs reconstructed video stream 36.

The present invention is utilized within decoder 22. To better understand the present invention, we will provide a brief and simplistic overview of how digital images are stored, compressed and transmitted.

An MPEG video sequence is essentially a series of pictures taken at closely spaced time intervals. Quite often a picture may be quite similar to the one that precedes it or the one that follows it. For example, video of waves washing up on a beach would change little from picture to picture. Except for the motion of the waves, the beach and sky would be largely the same. Once the scene changes, however, some or all similarity may be lost. The concept of compressing the data in each picture relies upon the fact that many images do not change significantly from picture to picture. Thus, considerable savings in data transmission can be made by transmitting only the differences between pictures, as opposed to the entire picture. In the MPEG-2 standard a picture is referred to as a "frame". This is terminology we will use from now on.

There are basic forms of compression for a frame in a video stream, interframe and intraframe. Interframe compresses data based upon similarities between frames (thus "inter"), while intraframe compresses data based upon similarity within a region of a single frame (thus "intra"). As with our earlier wave example, intraframe compression can take advantage of the fact that much of the sand on the beach is quite similar within regions of the frame. Similarly interframe compression can make use of the fact that the scene on a beach may not change that often.

Figure 2:
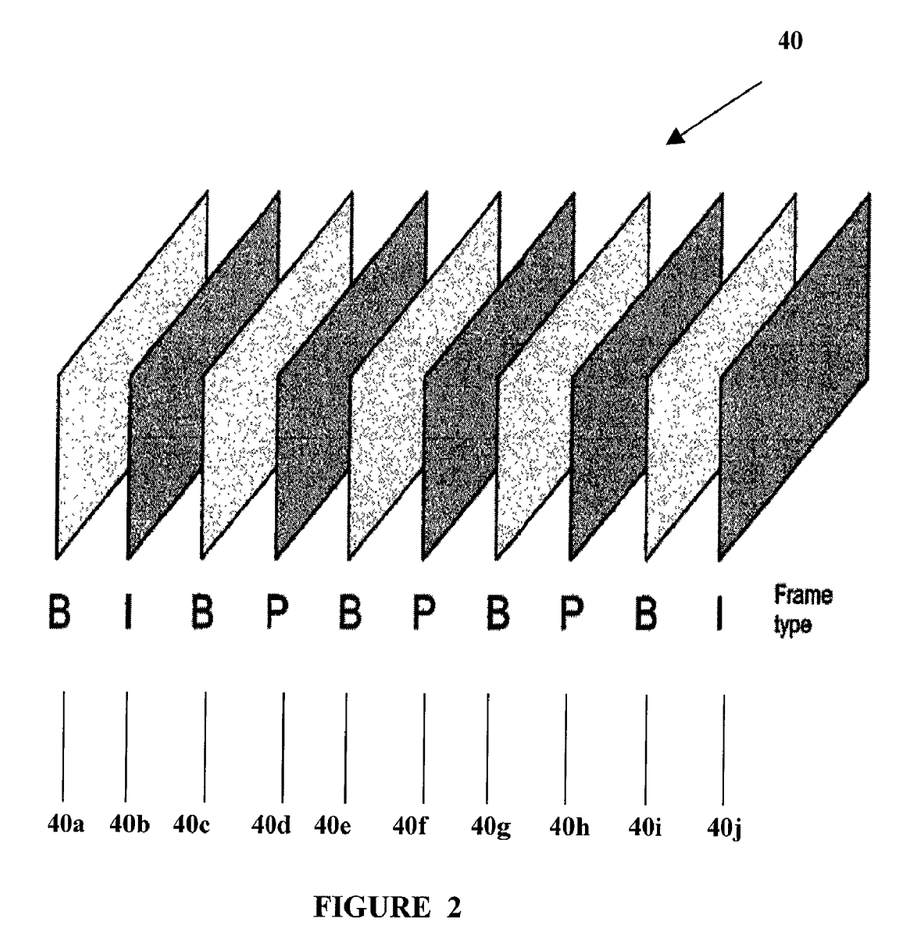
FIG. 2 is a schematic diagram of a group of frames in an MPEG video sequence.

The frames of an MPEG video sequence are of three different types: I, P and B. I frames are intra-coded frames and are coded independently, without reference to the other frames. P-frames are predictive-coded frames, which predict content based upon preceding I or P-frames. B-frames are bidirectionally predictive-coded frames. B-frames may predict content based upon immediately preceding or following I or P-frames, thus the use of the term "bidirectional". FIG. 2 is a schematic diagram of a group of frames in an MPEG video sequence, shown generally as 40. Frames 40a to 40j are of different types, namely I, P and B. Frames 40a to 40j are shown in the order in which they would be displayed to a user. However, due to the requirement that P and B frames require information from other frames, the transmission order is actually: 40b, 40a, 40d, 40c, 40f, 40e, 40h, 40g, 40j, and 40i. For example, frame 40i being a bidirectional frame cannot be transmitted until the differences in frames 40h and 40j have identified.

Referring back to our example of waves on a beach, imagine we are looking at the waves wash up on the beach from a stationary camera and the sky has only motionless clouds. The only thing that is moving are the waves. In such a scene, encoder 12 (see FIG. 1) would create an I-frame which is transmitted to decoder 22. Decoder 22 passes the image on to video stream 36 whereupon it is displayed to a user. Decoder 22 retains a copy of the information contained in that image. Next, encoder 12 generates a P-frame based on the motion of the waves. It generates a frame that has the identical background of the proceeding I-frame. The waves have moved a little. Encoder 12, using complex mathematics, compares the image it has predicted with the actual image. Encoder 12 then transmits data that represents this comparison, not the entire image. Decoder 22 utilizes the same complex mathematics. For decoder 22 to determine what the next frame should look like, it only needs to know the error between the prediction and the actual image to recreate the P-frame.

Should the scene change to a close up of a surfer on the beach, the image will have changed completely. This throws off the prediction process and requires an entirely new image, thus the process starts again.

It is not the intent of the present disclosure to provide in detail the steps of the prediction process, as they are well known in the art.

The basic building block of an MPEG frame is a macroblock. A macroblock consists of a 16×16 array of luminance (grayscale) pixels together with two 8×8 blocks for chrominance (colour) pixels. It is not the intent of this disclosure to discuss the technical details of the information in a macroblock as it is well known to those skilled in the art and well defined in the MPEG-2 standard. At the introductory level, one may consider a macroblock to be a digital equivalent of a portion of the analog RGB (red, green, blue) information transmitted in video source signal 24 of FIG. 1.

The difference between the values of a macroblock in a P-frame and the actual frame are grouped together into 8×8 blocks. A spatial transform is then applied to each block of difference values. The spatial transform serves to decompose the 8×8 block into a weighted sum of spatial frequencies. There are 64 spatial frequencies which may occur in an 8×8 block of data. In the spatial transform, each spatial frequency has a corresponding coefficient. Each coefficient represents the contribution of one of the spatial frequencies in the pattern of the 8×8 block of data. In the case of an I-frame the macroblocks of the frame are transformed as there is no interframe prediction.

It is this spatial transform that is at the heart of both interframe and intraframe coding. The transform most commonly used is known as the discrete cosine transform (DCT). The converse of this transform is known as the inverse discrete cosine transform (iDCT).

The DCT algorithm for an 8×8 block is as follows:

$$F(\mu, \nu) = \frac{1}{4} C(\mu) C(\nu) \sum_{x=0}^{7} \sum_{y=0}^{7} f(x, y) \cos\left[\frac{(2x+1)\mu\pi}{16}\right] \cos\left[\frac{(2y+1)\nu\pi}{16}\right]$$

$C(\mu)=1$ for $\mu=1,2,\ldots,7$ $C(\mu) = \frac{1}{\sqrt{2}}$ for $\mu = 0$

In the above equations x,y are pixel indices in an 8×8 block and u, v are indices in a DCT coefficient 8×8 block. Thus, an 8×8 array of numbers, f(x,y) is the input to a mathematical formula, and the output is an 8×8 array of different numbers, F(u,v).

The inverse Discrete Cosine Transform (iDCT) is:

$$f(x, y) = \frac{1}{4} \sum_{\mu=0}^{7} \sum_{\nu=0}^{7} C(\mu) C(\nu) F(\mu, \nu) \cos\left[\frac{(2x+1)\mu\pi}{16}\right] \cos\left[\frac{(2y+1)\nu\pi}{16}\right]$$

In principle, applying the iDCT to a transformed array yields the original array. Thus, transforming the data does not modify the data but instead, changes its representation.

To further reduce the data transmitted from encoder 12 to decoder 22, a process known as quantization is applied to the coefficients. A coefficient is quantized by dividing it by a nonzero positive integer (the quantization value) and rounding the quotient (the quantized coefficient), to the nearest integer. The larger the quantization value, the lower the precision of the quantized coefficient. Lower precision quantized coefficients can be transmitted with fewer bits. This process allows the encoder 12 to selectively discard activity that the human eye cannot readily receive.

Decoder 22 reverses this process by first inverting the quantization process and then applying an iDCT.

As mentioned above, a DCT is applied to each 8×8 block within a macroblock. A block size that is a power of two (8×8 is most common) lends itself to fast DCT and fast iDCT algorithms.

An example of a fast iDCT algorithm is disclosed in Chen W. H., Smith C. H., Fralick S. C., "A Fast Computational Algorithm for the Discrete Cosine Transform", IEEE Trans. Commun., 25:1004-1009, 1997. The 'Chen-DCT' algorithm requires 16 multiplications and 26 additions for an eight point one dimensional DCT and is still often used today, even though more efficient and accurate (when implemented with fixed point arithmetic) schemes have been proposed.

The scaled 8-DCT disclosed in; Agui T., Nakajima M., "A Fast DCT-SQ Scheme for Images", Trans. IEICE, 71:1095-1097, 1988, is particularly attractive as a forward DCT as it requires only 13 multiplications (8 of which can be lumped into a successive quantizer look-up) and 29 additions. A second method is described in; Loeffler C., Ligtenberg A., Moschytz G. S., "Practical Fast 1-D DCT Algorithms with 11 Multiplications", Proc. ICASSP'89, 988-991, 1989. While requiring 12 multiplications and 32 additions, the described implementation has the advantage that no data path contains more than one multiplication, making a simple and accurate scaled fixed-point implementation possible.

Even with such fast algorithms, the iDCT is a significant burden on real-time video encoders 12 and decoders 22. Additional speed-ups are possible with the following steps:

1) Taking into account the statistics of the signal to be transformed a variable execution time algorithm may be devised. The fundamental idea resembles that of source coding. We would like an algorithm that provides the result in a very short time for most image blocks, while it may take longer for unlikely blocks, so that average execution time is minimal. This is effective for software codecs only, as hardware design must be based on worst case. Codec stands for Coder/Decoder, it is a hardware of software device that that converts analog signals to digital to be read by a computer or transmitted over a network, and converts the digital signals back to analog. In the case of a software Codec, the amount of time taken to process each macroblock can vary, however in the case of a hardware Codec the time is fixed. Thus hardware must deal with the worst case scenario.

2) An 8×8 2D iDCT designed by row-column decomposition can be accelerated by operating on four 1D iDCTs in parallel as described in Shibata Y., Chen Z., Campbell R. H. "A Fast Degradation—free Algorithm for DCT Block Extraction in the Compressed Domain". IEEE International Conference on Acoustics, Speech and Signal Procession, Pheonix, March 1999. As in Table 1, the first iDCT would operate on columns one to four and rows one to eight. The second iDCT would operate on columns five to eight and rows one to eight. The third iDCT would operate on rows one to four and columns one to eight. Finally, the fourth iDCT would operate on rows five to eight and columns one to eight. Thus, the parallel iDCTs each operate in sequence on four of the eight rows or four of the eight columns of the 2D iDCT.

TABLE 1

Zig-zag scan pattern for MPEGx, H.26x DCT coefficients.
Four 1D iDCT pattern for quad-word parallel SIMD implementation.

| | 1st | | | | 2nd | | | |
|---|---|---|---|---|---|---|---|---|
| 3rd iDCT → | 1 | 2 | 6 | 7 | 15 | 16 | 28 | 29 |
| | 3 | 5 | 8 | 14 | 17 | 27 | 30 | 43 |
| | 4 | 9 | 13 | 18 | 26 | 31 | 42 | 44 |
| | 10 | 12 | 19 | 25 | 32 | 41 | 45 | 54 |
| 4th iDCT → | 11 | 20 | 24 | 33 | 40 | 46 | 53 | 55 |
| | 21 | 23 | 34 | 39 | 47 | 52 | 56 | 61 |
| | 22 | 35 | 38 | 48 | 51 | 57 | 60 | 62 |
| | 36 | 37 | 49 | 50 | 58 | 59 | 63 | 64 |

As many input coefficients of the iDCT are zero due to quantization, fast iDCT algorithms for sparse blocks that eliminate the calculation for zero coefficients have been proposed. It is straightforward to exploit this sparseness, and context-dependent fast algorithms have been in use for a number of years. In particular, if the coefficient array is very sparse, look-up table based methods can be used where scaled versions of the basis functions are stored, and the few scaled basis functions corresponding to the non-zero coefficients are simply superimposed. A discussion of the use of table based methods is provided in Hung A. C., Meng T., "Statistical Inverse Discrete Cosine Transforms for Image Compression". SPIEIS&T Electronics Imaging 1994, 2187: 196-205. When the coefficient array is less sparse, the pruned iDCT discussed in Wang Z, "Pruning the Fast Discrete Cosine Transform", IEEE Trans. Commun., 39:640-6543, 1991 is a more efficient solution to eliminate calculations for zero coefficients. The fast DCT of Hou H. S., "A Fast Recursive Algorithm For Computing the Discrete Cosine Transform", IEEE Trans. ASSP, 35:1455-1461, 1987, is a 13 multiplication and 29 addition scheme that is particularly well-suited for a pruned iDCT implementation as discussed by Wang Z., "Pruning the Fast Discrete Cosine Transform", IEEE Trans. Commun., 39:640-643, 1991. The method of Hou, realizes a minimum of operations relative to other fast methods such as Shibata Y., Chen Z., Campbell R. H. "A Fast Degradation-free Algorithm for DCT Block Extraction in the Compressed Domain". IEEE Int. Conf. on Acoustics, Speech, and Signal Processing, Phoenix, March 1999, (see Table 2).

On modern microprocessors, software algorithm performance must consider not only the number of operations and their complexity and contention for pipelined resources, but also memory bandwidth, and data and instruction access patterns (cache miss and branch misprediction overhead). In this disclosure, we describe techniques that are effective for reducing the execution time for the iDCT using SIMD instructions on modern microprocessors. Performance is evaluated on the Intel Pentium processor family. First, existing techniques are described. The distribution of zero coefficients is analyzed for several sequences, and exploitable properties are observed. Second, a source adaptive method to select the available iDCT algorithms based on the distribution of zero coefficients is proposed. Finally, the performance of an implementation of this technique for a software MPEG-2 decoder is tested and its performance described.

1.0 Multimedia Instruction iDCT 1.1 State-of-the-Art 1D iDCTs may be performed in parallel on an 8×8 array of coefficients as shown in Table 1. An optimized implementation with Intel SIMD instructions can realize between 3 and 5 times speed-up in comparison to an optimized scalar implementation as described in the following documents:

a) Intel, "Using MMX Instructions in a Fast iDCT Algorithm for MPEG Decoding". AP-528, March 1996; and
 b) Intel, "JPEG Inverse DCT and Dequantization". AP-886, March, 1996.

An additional 15%, ranging from 10% at 10 Mbps to 20% at 4 Mbps, speed-up may be realized by exploiting the iDCT for sparse blocks. An efficient method to classify blocks is to use their EOB marker value, which is directly available from the compressed bit stream.

The EOB marker value indicates that all further coefficients in the block have a value of zero. Referring to Table 1, the coefficients of the block have been ordered from one to sixty four. The first coefficient is referred to as the DC coefficient. Table 1 has two axes, one for horizontal frequency and one for vertical frequency. The magnitude of each coefficient in Table 1 indicates its contribution to the horizontal and vertical frequencies of the original block. The DC coefficient corresponds to zero horizontal and vertical frequency.

The zig-zag scan pattern used in MPEG, H.26x, and JPEG standards is shown in Table 1. In other words, the coefficients are scanned in a zig-zag pattern from one to sixty-four. An EOB value in coefficient one indicates that only the DC coefficient is non-zero, while an EOB value of ten coefficient ten indicates that no coefficient outside the 4×4 block of lowest frequency coefficients (i.e. the block bounded by rows one to four and columns one to four) is non-zero.

The document "Fast 2D iDCT Implementation with Multimedia Instructions for a Software MPEG2 Decoder", by Murata E., Ikekawa M., and Kuroda I., IEEE International Conference on Image Processing, Chicago, October 1998 (hereinafter referred to as "Murata et al"), proposes a simplistic version of the present invention by utilizing the following iDCT algorithms:

1) iDCT_DC: When EOB is 1, the DC coefficient may be scaled and replaced over the 8×8 block.

2) iDCT_AC: A forward mapped iDCT when only 1 (not the DC) coefficient is non-zero. Implemented with table look-up and scaling (multiplication) by the coefficient. This requires the overhead of counting the number of non-zero coefficients (for all blocks), as well as penalties for data cache misses on the table look-up. For this reason, this alternative is only made available when decoding MPEG B-frames which often contain a much larger number of such blocks than 1 and P-frames.

3) iDCT 4×4: If EOB<=10 then the first, third, and fourth iDCTs in Table 1 may be pruned as the four highest frequency coefficients are zero, (Arg 4 in Table 2). The $2^{nd}$ iDCT will be all zero, so need not be performed.

TABLE 2

| Ops/DCT | Arg 8 | Arg 7 | Arg 6 | Arg 5 | Arg 4 |
|---|---|---|---|---|---|
| Multiply | 13 | 12 | 11 | 10 | 9 |
| Add | 29 | 25 | 22 | 19 | 17 |

4) iDCT_Normal: A full 8×8 iDCT is used when the EOB marker value is greater than 10.

Due to the overhead required to test for each alternative algorithm, speculative execution pipeline flushes on branch mispredictions and instruction cache miss penalties, simply making a larger number of alternative iDCT algorithms available does not necessarily increase performance.

1.2 Improving on the State-of-the-Art

Figure 3:
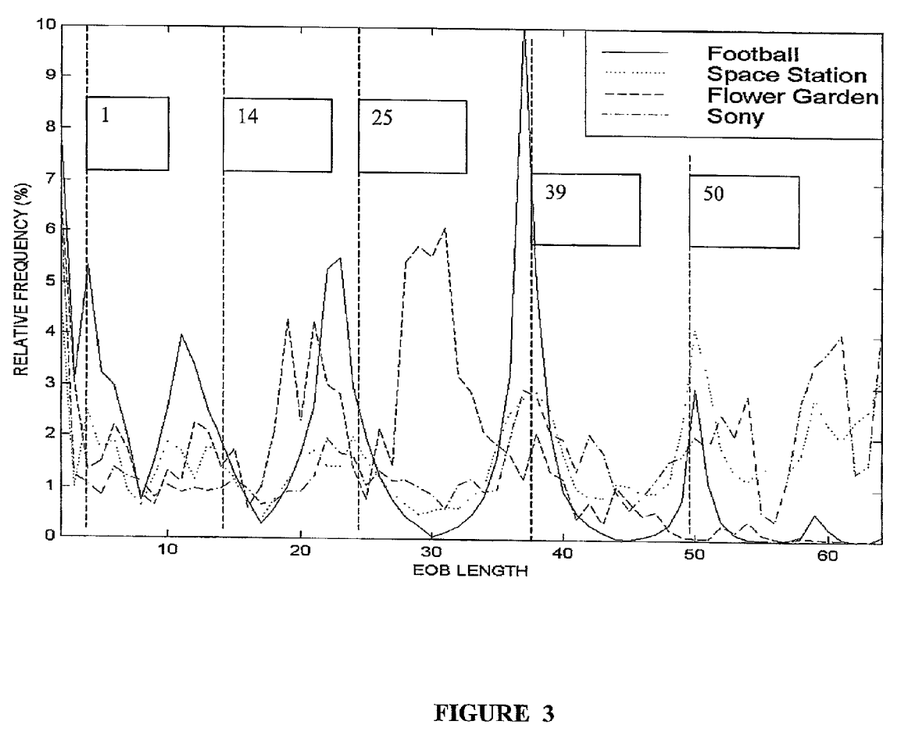
FIG. 3 is a histogram of the frequency of B frames in reference MPEG sequences.

To improve on the current state-of-the-art, we have observed that two additional properties of typical distributions of non-zero coefficients in MPEG-2 compressed video may be exploited:

1) EOB address probability distributions may vary significantly for different video shots and different bit rates. For this reason, the optimal mix of iDCT routines will vary from shot to shot. A shot is a sequence of frames bounded on each side by a video transition, for example a cut frame, a dissolve, or a cross-dissolve. Average histograms for B-frames (the most common frames) contained in both commercially compressed and reference model MPEG-2 compressed 'Football', 'Space Station', 'Flower Garden', and 'Sony' sequences are shown in FIG. 3.

The bit rates for the above samples ranged from four to ten Mbps.

Figure 4:
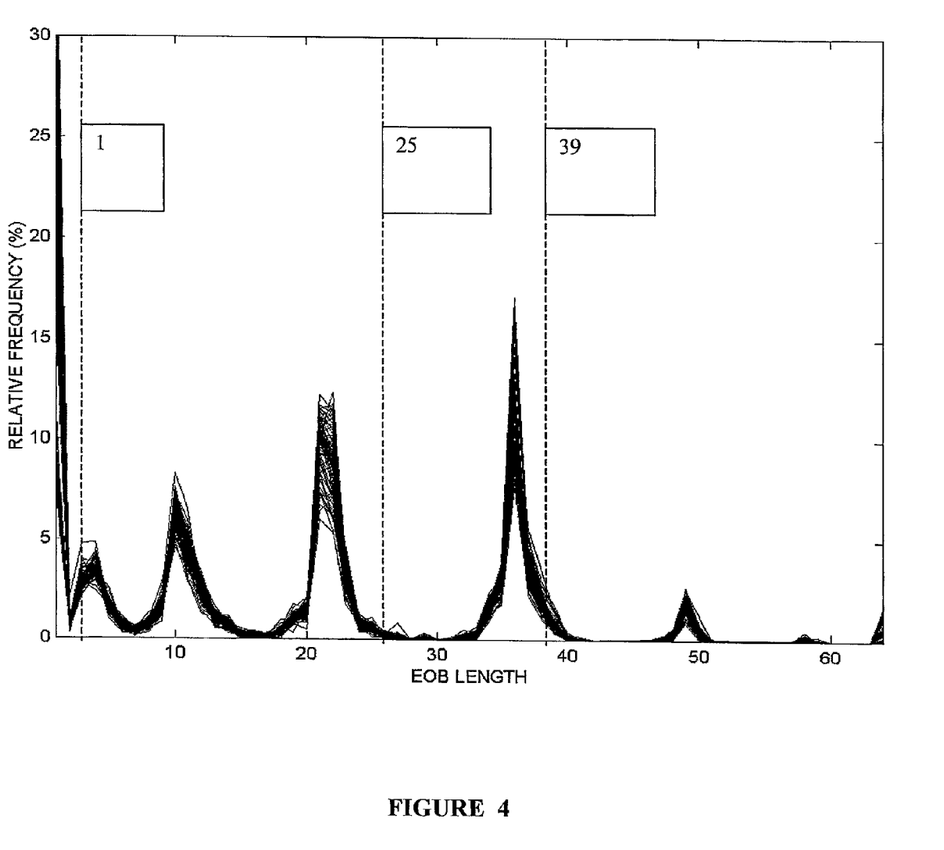
FIG. 4 is a graph of superimposed B frame histogram for the 'DVM Demo' MPEG sequence.

2) Within a shot and over spans of a few hundred frames EOB histograms often show little significant variance. Therefore, the optimal mix of iDCT routines remains fairly static within an individual shot. FIG. 4 shows superimposed B-frame histograms for the commercially encoded 'DVM Demo' sequence at 4 Mbps.

Choosing a customized set of SIMD iDCT routines for each shot improves average decoding speed, but does not introduce significant branch misprediction penalties, since the same code is used for the entire shot. It was found during experimentation, that the following two principles should be followed:

1) To minimize branching overhead and penalties a limited number of alternative iDCTs must be available at the same time in each custom iDCT set; and 2) To control the size of the compiled code and branching overhead, the number of customized iDCT choices must be limited. No significant branching penalties need be incurred since the same set is used for the entire shot.

Figure 5:
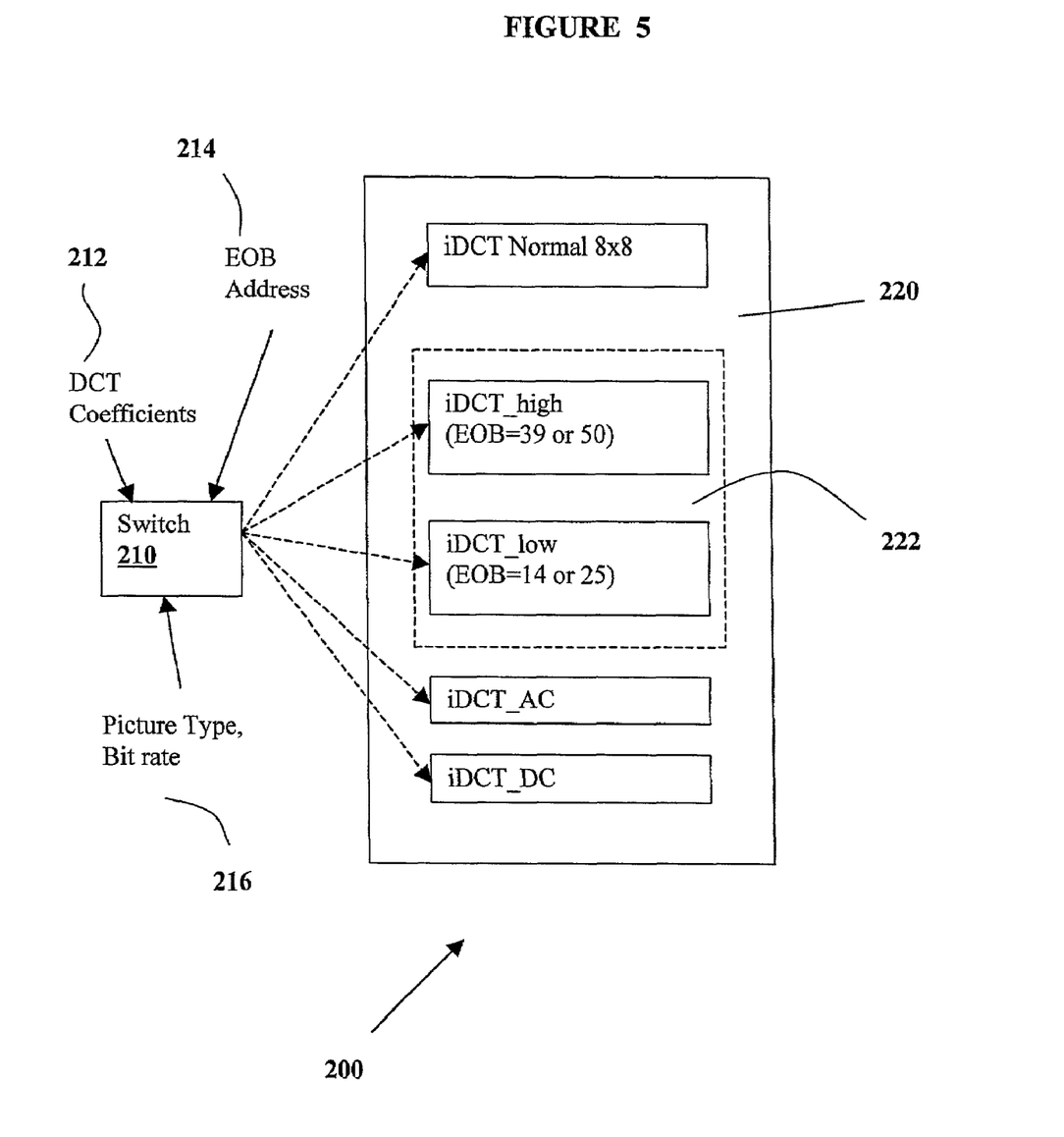
FIG. 5 is a block diagram illustrating the logical components of an embodiment of the present invention.

Referring now to FIG. 5, a block diagram illustrating the logical components of an embodiment of the present invention is shown generally as 200. As shown in FIG. 5, switch 210 accepts a plurality of inputs from three sources, namely: DCT coefficients 212, EOB Address 214, and Picture Type Bit rate 216. Picture Type Bit rate 216 affects the EOB histogram, as more macroblocks will have larger EOBs since more coefficients will be non-zero at higher bitrates. Based upon the input provided to switch 210, one of a plurality of iDCT algorithms from set 220 is selected. Subset 222 contains iDCT algorithm iDCT_high and iDCT_low, based upon the EOB histogram of B-frames in the sequences illustrated in FIG. 3, For example, a version of iDCT_high would be selected for an EOB length of 39 or 50. Similarly a version of iDCT_low would be selected for an EOB length of 14 or 25. FIG. 5 shows two independent choices for each of iDCT_high and iDCT_low, resulting in four different customized iDCT algorithms that may be specified for decoding the B-frames of a particular shot. As discussed earlier, iDCT_AC, iDCT_DC and iDCT_Normal are selected based upon the criteria defined by Murata et al.

1.3 Pruned iDCTs for Sparse Blocks

Table 2 shows the number of operations required for Hou's fast iDCT algorithm when it is pruned to eliminate calculations for high frequency zero coefficients. For example, a full eight point iDCT requires 13 multiplies and 29 adds, while the pruned iDCT that eliminates unnecessary operations when the four highest frequency coefficients are zero requires 9 multiplies and 17 additions.

Table 3 shows the minimum argument of pruned iDCTs for several EOB addresses when the iDCT is implemented as shown in Table 1 with four SIMD 1D iDCTs.

TABLE 3

| EOB | Col. 1-4 | Col. 5-8 | Row 1-4 | Row 5-8 |
|-----|----------|----------|---------|---------|
| 64  | 8        | 8        | 8       | 8       |
| 57  | 8        | 7        | 8       | 8       |
| 50  | 8        | 6        | 8       | 8       |
| 47  | 8        | 5        | 8       | 8       |
| 39  | 8        | 4        | 8       | 8       |
| 35  | 7        | 4        | 8       | 8       |
| 31  | 7        | 3        | 8       | 8       |
| 27  | 7        | 3        | 6       | 6       |
| 25  | 7        | 2        | 6       | 6       |
| 20  | 5        | 2        | 6       | 6       |
| 14  | 5        | 0        | 4       | 4       |
| 10  | 4        | 0        | 4       | 4       |

Using Tables two and three together gives the number of SIMD multiplications and additions that are required to implement an 8×8 iDCT for each range of EOB addresses. Adding up the number of cycles required by each SIMD instruction then gives a rough estimate of execution time in clock cycles. Actual execution time varies somewhat depending on data dependencies and resource contention.

1.4 A Bound on Execution Time Improvement

The time required to perform the iDCT for the blocks of a frame, ignoring all overheads and penalties, is determined only by the set of iDCT algorithms that are available, their respective execution times, and the frequency with which they are invoked, as specified by the frame's EOB histogram.

Figure 6:
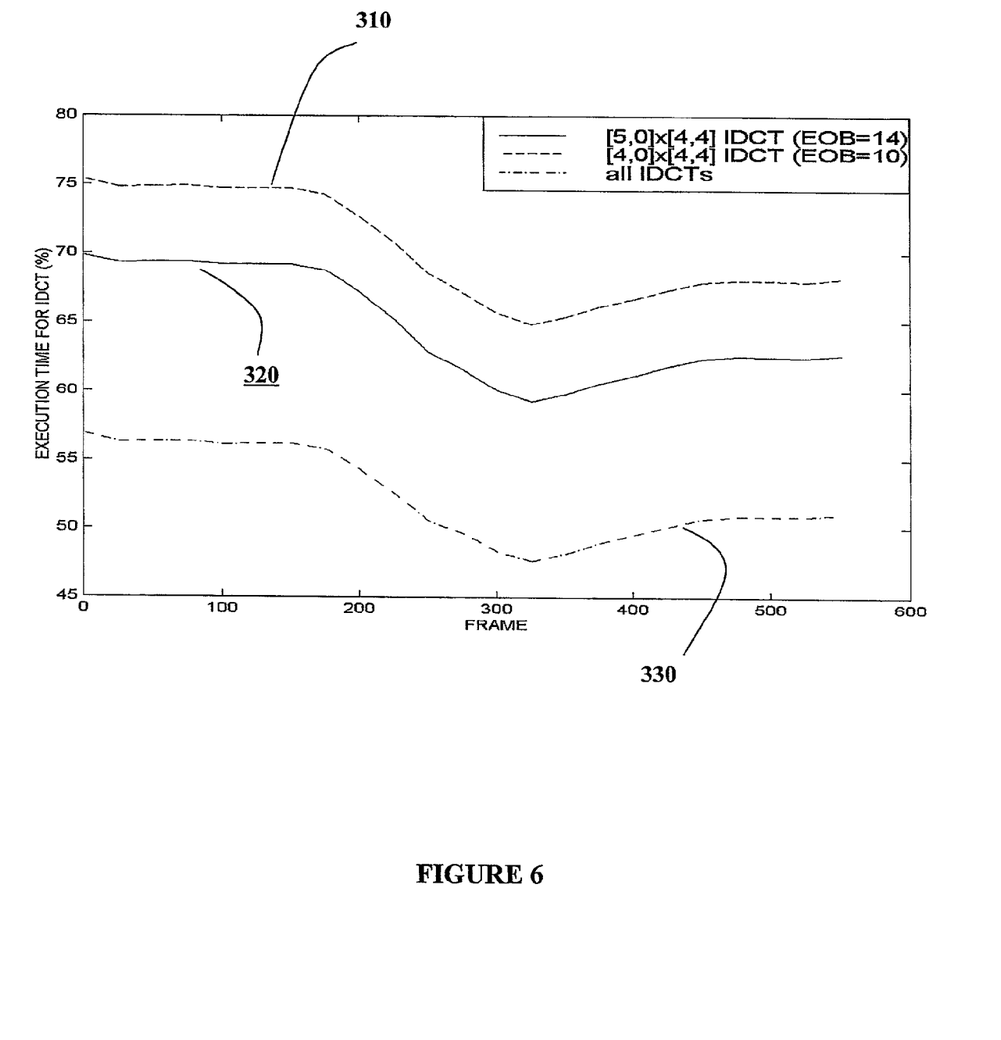
FIG. 6, is a chart showing iDCT execution times without overhead.

FIG. 6 shows the minimal processor time required by a Pentium III 450 processor using MMX instructions to implement several iDCT configurations for each of the B-frames of the 'Dvm Demo' sequence. The advantage of using MMX quad-word instructions is that it allows four pieces of data to be simultaneously processed. In general, this should lead to a four-time speed up of the algorithm. In practice, there is a slight penalty to structure the data so that it is properly aligned to be used by the quad word multimedia SIMD instructions. For example:

unsigned char a[4], b[4], c[4];
for i=0 to 3
$c[i]=a[i]+b[i]$

Where 'a' and 'b' are four individual bytes, aligned on 32 bit boundaries in RAM. Normal non-quad processing requires four CPU cycles to calculate the values for 'c'. The use of quad word instructions allows the calculation to be made in one CPU cycle.

Number of cycles is shown relative to the number of cycles required with a full 8×8 DCT. Three alternatives are shown:

1) The method of Murtata et al, (EOB=10), using the [4,0]×[4,4] implementation from Table 3, for a 4×4 iDCT in place of iDCT_high or iDCT_low is shown as 310.

2) A method using the [5,0]×[4×4] implementation of a 5×4 iDCT (EOB=14) in place of iDCT_high and iDCT_low is shown as 320.

3) A method using all possible iDCTs listed in Table 3 is shown as 330.

As is shown, ignoring penalties and overheads, the maximum improvement that could be expected for decoding this MPEG-2 file with the benefit of pruned 1D iDCTs is in the range of 47% to 57%, dependent upon the frame.

2.0 Implementation 2.1 Source Adaptation

A reasonable execution time model that incorporates penalties and overheads includes frequency weighted (taken from an EOB histogram) overhead cycles for the number of branches required to choose each of the available iDCT routines. More significant, however, are the average branch misprediction penalties and cache miss penalties. A conservative model is that branch misprediction penalties are equal to the lesser of P(B) and (1−P(B)) multiplied by the number of branch misprediction penalty cycles (where P(B) is the probability that the branch is taken). In practice, branch prediction algorithms are designed to outperform random selection. This model is used to predict, given the EOB distribution of the first B-frame of a shot, which combination of iDCT routines will be most efficient for the following B-frames.

The overhead of constructing a 64 element EOB histogram is small for the Pentium architecture, as it may be easily maintained in L1 (internal processor) cache during variable length decoding. In practice, negligible overhead is incurred by re-evaluating the model for the first B-frame of every MPEG group of pictures (GOP). This solves the problem of having to identify shot boundaries at which to re-evaluate the model, since GOPs are typically contained within individual shots.

For the test sequences of FIG. 3 predicted execution time was compared with the option of using any set from the SIMD iDCTs of Table 3. It was found that the optimal set for each sequence was always within 2% of just using 2 pruned iDCT routines: either EOB=50 or EOB=39 along with either EOB=25 or EOB=14 (indicted in bold face in Table 3). Moreover, the predicted optimal set was consistent for every GOP within a given test sequence. These observations led to the design of the iDCT structure shown in FIG. 5.

2.1 Performance Evaluation

Figure 7:
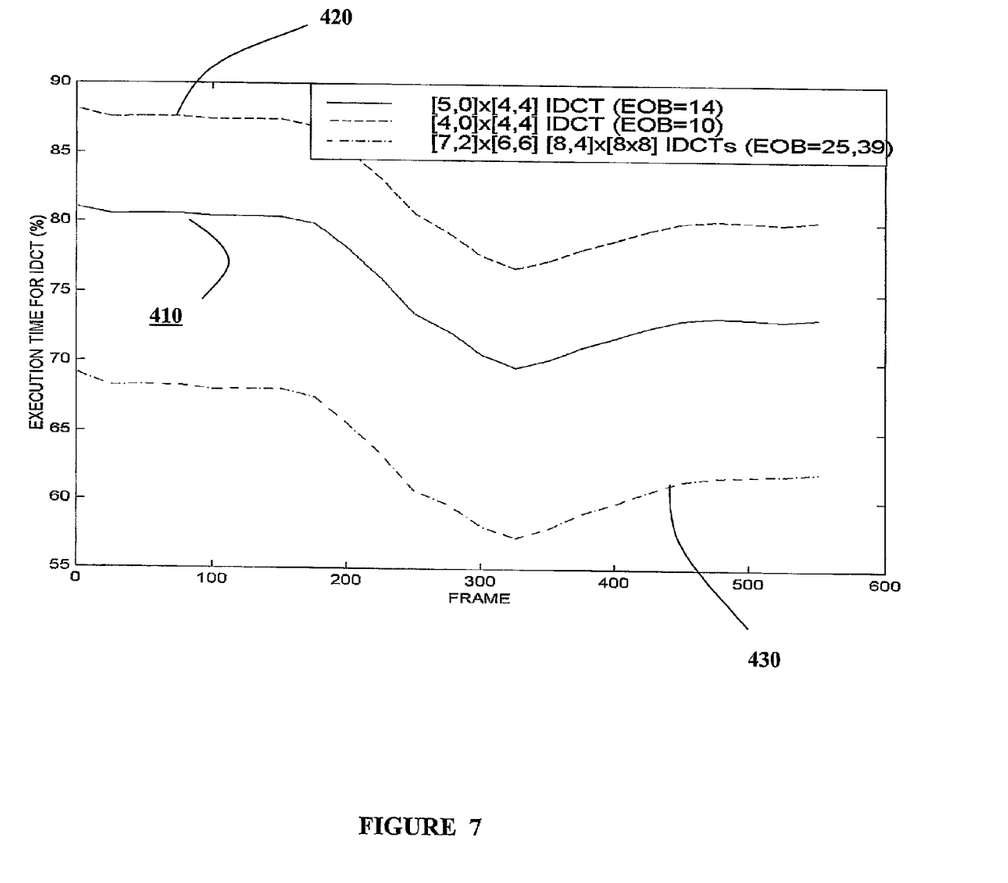
FIG. 7, is a second chart showing iDCT execution times including overhead.

FIG. 7 shows performance improvement of execution time (relative to a full 8×8 SIMD iDCT) for the iDCT routine including overheads and penalties on a Pentium III 450 MHz machine for the 'Dvm Demo' sequence with the following three algorithms:

1) The method of Murata et al, shown as 420.

2) The method of Murata et al, modified to use a 5×4 SIMD iDCT and an EOB threshold of 14 rather than 10, shown as 410.

3) A customized iDCT option that uses iDCT_low (EOB=25) [7,2]×[6,6] SIMD implementation of a 7×6 iDCT and iDCT_high (EOB=39) [8,4]×[8,8] SIMD implementation of an 8×8 iDCT, shown as 430. This mix of iDCT routines was consistently predicted by the above-described source adaptation model to be the most efficient combination for every GOP in the 550 frame sequence.

It can be seen that execution time is reduced by about 15% in FIG. 7 (4 Mbps) with the method of Murata et al, (EOB=10), the previously reported state-of-the-art, shown as 420. In comparison, execution time is reduced 22% simply by replacing the 4×4 iDCT proposed by Murata et al, with a 5×4 iDCT (EOB=14), shown as 410, that captures a much larger percentage of sparse blocks but requires only one extra SIMD instruction (see Table 3). All the test sequences shown in FIG. 7 demonstrated at least a 4% reduction in execution time with this simple modification.

Finally, method 430 shows a 35% reduction in execution time with the new source adaptive control method (EOB=25, 39, 4 Mbps). The 'Football' sequence improved 9%, 15%, and 18% with methods (1), (2), and (3) (EOB=14, 50, 5 Mbps) respectively. The 'Flower Garden' sequence improved −2%, 4%, and 22% with methods (1), (2), and (3) (EOB=25, 50, 15 Mbps) respectively. The synthetically generated 'Space Station' sequence improved 0%, 6%, and 6% (EOB=14, 4 Mbps), while the 'Sony' ballet sequence improved by −6%, 2% and 2% (EOB=14, 15 Mbps).

These results confirm the results of Murata et al, that at bitrates around 4 Mbps natural sequences such as 'Dvm Demo' and 'Football' can realize significantly reduced execution time by optimizing the software iDCT for sparse blocks. In addition, we can note here that even at higher bit rates around 15 Mbps, while the 'Flower Garden' sequence does not realize a significant advantage with the method of Murata et al, it does with our new method. At this bit rate the 'Sony' sequence realizes little benefit though, which confirms the result reported in Murata et al. Finally, the synthetically generated 'Space Station' sequence realizes little benefit even at a low bit rate of 4 Mbps.

Software decoders skip frames when the CPU power isn't sufficient to achieve real-time decoding. Using the iDCT__ 4×4 instead of the normal iDCT in B-frames was proposed in Murata et al as an alternative that would permit substantially reduced computation, at the expense of decreased image quality. It should be noted that the iDCT__5×4 (EOB=14) or iDCT__7×6 (EOB=25) may be used instead for this purpose, when available as per FIG. 5, and that they result in greater retention of high frequency scene detail. While iDCT__5×4 results in almost the same amount of computational relief, iDCT__7×6 is about half as effective for this purpose.

Although the embodiment of the present invention was implemented on an Intel based platform utilizing quad word based instructions; it is not the intent of the inventors to limit the implementation to an Intel platform. As one skilled in the art will recognize, the use of EOB histograms to select an optimal set of iDCT algorithms may be implemented on any modern computing platform and instruction set.

Although the examples cited herein refer to the use of iDCT for MPEG-2 streams, it is not the intent of the inventors to limit the present invention to this domain. For example, the present invention may be used for JPEG images in an identical manner as those for I-Frames in an MPEG-2 stream.

Although the invention has been described with reference to certain specific embodiments, various modifications thereof will be apparent to those skilled in the art without departing from the spirit and scope of the invention as outlined in the claims appended hereto.

I claim:

1. A method for selecting inverse discrete cosine transform (iDCT) algorithms, comprising:
    a) examining the coefficients of a plurality of DCT blocks corresponding to selected frames within a video shot to determine an End of Block (EOB) length for each of the examined DCT blocks, wherein a video shot is a sequence of frames bounded on each side by a video transition;
    b) examining a distribution of EOB lengths associated with a single selected frame;
    c) selecting a customized subset of iDCT algorithms for the entire video shot from a larger set of iDCT algorithms according to the distribution of EOB lengths for the single selected frame; and
    d) selecting and executing one of the customized subset of iDCT algorithms for each of the plurality of blocks within the video shot according to the associated EOB lengths of the blocks.

2. The method of claim 1, wherein said larger set of iDCT algorithm includes an iDCT_Normal algorithm, an iDCT_AC algorithm, an iDCT_high algorithm, an iDCT_low algorithm and an iDCT_DC algorithm.

3. The method of claim 2 wherein said iDCT_high algorithm is based upon an EOB length of 39 or 50.

4. The method of claim 2 wherein said iDCT_low algorithm is based upon an EOB length of 14 or 25.

5. The method of claim 1 wherein the video transition includes one from a group consisting of: a cut frame, a dissolve, or a cross-dissolve.

6. A method as recited in claim 1 wherein examining the distribution of EOB lengths includes generating a histogram of EOB lengths for the examined DCT blocks representing a relative frequency of occurrence of EOB lengths for the single selected frame.

7. A method as recited in claim 1, wherein the selected frames are B frames.

8. A method as recited in claim 1, further comprising: repeating (a)-(d) for a next video shot until a current video shot is a last video shot.

9. A method as recited in claim 1, wherein the single selected frame is the first B-frame of the video shot.

10. A system for reducing iDCT execution time, said system comprising:
   a) means for examining the coefficients of a plurality of DCT blocks corresponding to selected frames within a video shot in order to determine an End of Block (EOB) length for each of the examined DCT blocks, wherein a video shot is a sequence of frames bounded on each side by a video transition;
   b) means for examining a distribution of EOB lengths associated with a single selected frame;
   c) means for selecting a customized subset of iDCT algorithms for the entire video shot from a larger set of iDCT algorithms according to the distribution of EOB lengths for the single selected frame; and
   d) means for selecting and executing one of the customized subset of iDCT algorithms for each of the plurality of blocks within the video shot according to the associated EOB lengths of the blocks.

11. The system of claim 10 wherein the plurality of iDCT algorithms includes an iDCT_Normal algorithm, an iDCT_AC algorithm, an iDCT_high algorithm, an iDCT_low algorithm and an iDCT_DC algorithm.

12. The system of claim 11 wherein said iDCT_high algorithm is based upon an EOB length of 39 or 50.

13. The system of claim 11 wherein said iDCT_low algorithm is based upon an EOB length of 14 or 25.

14. The system as recited in claim 10,
   wherein the means for examining the distribution of EOB lengths includes means for generating a histogram of EOB lengths for the examined DCT blocks representing a relative frequency of occurrence of EOB lengths for the single selected frame.

15. The system as recited in claim 10, wherein the selected frames are B frames.

16. The system as recited in claim 10, wherein the system selects a customized subset of iDCT algorithms for each of the video shots in a video.

17. A computer program encoded on a computer readable medium containing instructions for selecting and executing inverse discrete cosine transform (iDCT) algorithms, said instructions performing the steps of:
   a) examining the coefficients of a plurality of DCT blocks corresponding to selected frames within a video shot to determine an End of Block (EOB) length for each of the examined DCT blocks based upon the position of the End of Block (EOB) coefficient;
   b) examining a distribution of EOB lengths associated with a single selected frame
   c) selecting a customized subset of iDCT algorithms for the entire video shot from a larger set of iDCT algorithms according to the distribution of EOB lengths for the single selected frame; and
   c) selecting and executing one of the customized subset of iDCT algorithms for each of the plurality of blocks within the video shot according to the associated EOB lengths of the blocks.

18. A system for reducing inverse discrete cosine transform (iDCT) execution time, said system comprising:
   a memory for storing a plurality of iDCT algorithms;
   a computer processor for examining the coefficients of a plurality of DCT blocks corresponding to selected frames within a video shot to determine an End of Block (EOB) length for each of the examined DCT blocks, wherein a video shot is a sequence of frames bounded on each side by a video transition, examining a distribution of EOB lengths for a single selected frame, selecting a customized subset of iDCT algorithms for the entire video shot from a larger set of iDCT algorithms according to the distribution of EOB lengths for the single selected frame, and generating an iDCT algorithm selection signal that identifies one of the iDCT algorithms from the customized subset of iDCT algorithms to be executed by the processor for each of the plurality of blocks within the video shot according to the associated EOB lengths of the blocks; and
   a switch connected to the processor and the memory that receives the selection signal from the processor and, in response, selects the identified iDCT algorithm for execution by the processor on the associated block.

19. The system of claim 18 wherein said switch accepts as input:
   a) a block of DCT coefficients;
   b) an End of Block address; and
   c) a picture type bit rate.

20. The system of claim 18 wherein said plurality of iDCT algorithms further comprises: an iDCT_Normal algorithm, an iDCT_AC algorithm, an iDCT_high algorithm, an iDCT_ low algorithm and an iDCT_DC algorithm.

* * * * *